United States Patent [19]

Bernard et al.

[11] 4,157,949

[45] Jun. 12, 1979

[54] CATALYTIC PROCESS FOR TREATING LIGHT GASOLINE STOCKS

[75] Inventors: Jean R. Bernard, St. Symphorien D'Ozon; Jacques Bousquet, Irigny, both of France

[73] Assignee: Societe Nationale Elf Aquitaine, Courbevoie, France

[21] Appl. No.: 865,246

[22] Filed: Dec. 28, 1977

[30] Foreign Application Priority Data

Dec. 30, 1976 [FR] France ................... 76 39549

[51] Int. Cl.$^2$ .................. C10G 13/02; B01J 23/56; C07C 9/06; C07C 5/24
[52] U.S. Cl. .......................... 208/112; 252/466 PT; 252/466 J; 208/110; 208/111; 585/752
[58] Field of Search ............... 208/112, 110, 111; 260/676 R, 683.65; 252/466 J, 466 PT

[56] References Cited

U.S. PATENT DOCUMENTS

| | | | |
|---|---|---|---|
| 3,871,997 | 3/1975 | Sinfelt et al. | 208/139 |
| 3,886,061 | 5/1975 | Weisang et al. | 208/138 |
| 3,900,386 | 8/1975 | Hayes | 208/111 |
| 3,901,827 | 8/1975 | Sinfelt et al. | 208/138 X |
| 3,929,619 | 12/1975 | Sinfelt et al. | 208/111 |
| 4,049,578 | 9/1977 | Reagan et al. | 208/138 X |

FOREIGN PATENT DOCUMENTS 843532 12/1976 Belgium.
2628958 1/1977 Fed. Rep. of Germany.

OTHER PUBLICATIONS

Chem. Abstracts, 8722333j, Belg 843,532 from Fr75/20516, Bernard, Turlier, & Bousquet; equiv. Ger. Offen. 2,628,958.

*Primary Examiner*—Delbert E. Gantz
*Assistant Examiner*—G. E. Schmitkons
*Attorney, Agent, or Firm*—Burgess, Ryan and Wayne

[57] ABSTRACT

This invention concerns a process for the selective hydrogenolysis of light gasoline stocks.

The process consists in treating light gasoline stocks, mixtures of n- and iso-paraffins containing from 5 to 7 carbon atoms, under hydrogenolysing conditions (temperature 150° to 450° C., pressure 1 to 80 bars, molar ratio of hydrogen to hydrocarbon comprised between 2 and 20), in the presence of a catalyst comprising iridium and another metal belonging to Column VIII of the Periodic Table, on a porous refractory oxide support, in order to obtain an ethane rich gaseous fraction and a liquid fraction consisting of a high octane gasoline.

18 Claims, No Drawings

CATALYTIC PROCESS FOR TREATING LIGHT GASOLINE STOCKS

This invention concerns a catalytic process for treating light gasoline stocks by selective hydrogenolysis, in order to obtain a gaseous fraction containing mainly ethane and propane, on the one hand, and a liquid fraction consisting of a high octane gasoline, on the other hand.

Reactions used for the hydrogenating splitting of carbon-carbon bonds are hydrocracking and hydrogenolysis, both of which have the same stoichiometry. However, a distinction can be made, as is done by J. A. Sinfelt in *Advances in catalysis* (Academic Press N° 23, p. 91, 1973): hydrocracking involves a bifunctional catalysis, with the catalyst consisting of a cracking acid support, hydrogenating metal sites being deposited on this support, while hydrogenolysis involves a monofunctional catalysis with reduced metals, in which the support does not play any direct part in the reaction.

Reactions of the first type are kinetically positive in relation to the hydrogen reagent, while those of the second type are often negative, especially at pressures of more than 10 bars.

The prior art describes selective hydrocracking of n-paraffins in a mixture of linear and branched paraffins.

U.S. Pat. Nos. 3,554,900 and 3,395,094, for example, describe selective hydrocracking of n-hexane into lighter hydrocarbons (butane and propane), while isohexanes are not converted. The catalysts are erionite or offretite zeolites with acid sites and a metal hydrogenating function (nickel). The mechanism involved is hydrocracking rather than hydrogenolysis. The particular selectivity of these catalysts arises from a steric factor known as "shape selectivity": the molecular sieves involved sorb only linear paraffins, which can then react on the catalytic sites, while the branched paraffins (which are more cumbrous) are not sorbed and do not react.

This type of process can therefore be used to obtain light hydrocarbon gases (butane and propane), and a gasoline with high isoparaffin content. However, the method lacks flexibility since there is no point in adjusting operating conditions to obtain a larger gas fraction, because the isoparaffins cannot be converted. Furthermore, mostly butane and propane are obtained, and their use is confined to fuels.

The Societe Nationale Elf-Aquitaine has already described processes for making ethane by hydrogenolysis of paraffins, e.g. in French patent applications 75 20516, 75 34868 and 75 38531. These processes involve catalysts with a support, either monometallic, in this case formed or iridium or rhodium, or bimetallic, in which case it comprises a second metal belonging to column VIII of the Periodic Table, in addition to iridium or rhodium (the Periodic Table referred to is contained for example in the 4th edition of Perry's *Chemical Engineer's Handbook*).

These patent applications show that a very high yield of ethane can be produced (60 to 80% weight), by treating a mixture of n- and isoparaffins containing from 5 to 6 carbon atoms, in the presence of iridium or rhodium-supported catalysts. It should be noted that the difference in reactivity between n-paraffins and iso-paraffins recorded for butanes is not evident for pentanes and hexanes. It has been discovered that the operating conditions for treatment by hydrogenolysis, on iridium-supported catalysts, of a light gasoline stock, namely a mixture of isoparaffins and n-paraffins containing from 5 to 7 carbon atoms per molecule, can be adjusted to limit conversion of the mixture by favouring conversion of the n-paraffins, thereby enriching the isoparaffin content of the uncovered fraction of the mixture. In other words, the process produces a gaseous fraction containing ethane and propane on the one hand, and a liquid fraction consisting of a high-octane gasoline, on the other hand. The selectivity of hydrogenolysis does not involve shape selectivity, as in the hydrocracking processes described above, but a reactivity discrimination among hydrocarbons of the particular catalyst which selectively transforms the components of the treated gasoline stock into ethane.

The present invention offers a more adaptable process than the already existing ones; depending on requirements, it allows with the same installation and feed, by adjusting a single operating parameter, such as temperature, either the obtention of a high yield of ethane, which can be used to feed a steam-cracking-unit, or the obtention of a large amount of isoparaffin-rich gasoline.

The invention concerns a process for simultaneous production of ethane on the one hand, and high-octane gasoline on the other hand, by selective hydrogenolysis of light gasoline stocks, namely a hydrocarbon cut containing mainly saturated hydrocarbons with from 5 to 7 carbon atoms per molecule, this process being characterized by the fact that a mixture of hydrogen and light gasoline stock is admitted to a reactor at a spatial velocity V, at a total pressure P, and at a temperature T in order to come into contact with a catalyst comprising a porous support of refractory oxide, and comprising iridium and a second metal selected from the group containing rhodium, osmium, ruthenium, palladium, platinum, cobalt, iron and nickel.

Light gasoline stocks forming the feeds to be treated by this new process have a distillation range the initial temperature of which is comprised between 0° and 20° C., and the final temperature of which is comprised between 80° and 100° C.

This treatment produces an ethane-rich gaseous fraction and an isoparaffin-rich liquid fraction.

Not all known hydrogenolysis catalysts are suitable for this new process, particularly not all those referred to in the patent applications mentioned above, since they do not all possess the quality of double selectivity, namely selectivity in relation to the feed components (n- and iso-paraffins) and selectivity for ethane production. Rhodium-based catalysts, for example, although they can produce ethane selectively, convert n- and iso-paraffins at comparable speed, so that an isoparaffin-rich liquid fraction cannot be obtained.

Catalysts suitable for this new process comprise iridium combined with another metal selected from the group containing iron, cobalt, nickel, ruthenium, rhodium, palladium, osmium and platinum, namely from those which, like iridium, belong to Column VIII of the Periodic Table as specified above.

The active metals are incorporated with a porous support of refractory oxide. The specific surface area of the support is generally between 10 and 600 sq.m/g, and preferably between 50 and 500 sq.m/g.

The support must be free of sulphate ions to ensure that the catalyst retains proper selectivity for ethane production. The sulphate ion content must be less than 0.5%, in weight, and preferably less than 0.1%. Support of selective hydrogenolysis catalysts remain inert during the reaction: in particular, they do not contain any acidity which could involve cracking of molecules, as happens in hydrocracking processes.

Refractory oxide supports for this new process are selected from alumina, silica, magnesia, silica-alumina, possibly neutralized, titanium oxide, zinc oxide, etc.

The total metal content of the catalyst is between 0.1 and 10% in weight, and preferably between 0.1 and 1%. The atomic ratio of iridium to the other metal of column VIII is preferably above 0.1, and advantageously between 0.16 and 8.

The combination of iridium and platinum is recommended.

The process to obtain isoparaffin-rich gasoline and ethane by selective hydrogenolysis of light gasoline stocks is performed at a total pressure P ranging from 1 to 80 bars, and preferably between 20 and 60 bars, in order to ensure stability for the catalyst. The molar ratio of hydrogen to hydrocarbon at the reactor inlet is between 2 and 20, preferably between 3 and 10. Conversion rate, defined by the percentage of hydrocarbons containing 4 or fewer carbon atoms, obtained from $C_5$, $C_6$, $C_7$ gasoline, is kept at between 10 and 90%. The conversion rate depends very much on the reaction temperature, catalyst activity and hourly spatial velocity. The reaction may be performed at a temperature T of between 150° and 470° C., and preferably between 250° and 450° C., depending on the type of cut involved in the reaction. The hourly spatial velocity V, defined as the ratio of the volume flow rate of the liquid mixture to the volume of catalyst, is usually between 0.1 and $10h^{-1}$.

The main objective of the process, production of ethane or production of high-octane gasoline, can be achieved simply by adjusting operating conditions in the unit. To obtain gasoline, the temperature and spatial velocity should be adjusted so that isoparaffins in the mixture are not converted. To obtain high yields of ethane more severe conditions should be applied, for example by raising the temperature by 30° to 50° C., so as to produce hydrogenolysis of the isoparaffins in the mixture. The exact choice of operating conditions will naturally depend in each case on the nature of the feed and the specific activity of the catalyst.

The octane number of the gasoline obtained by this new process naturally depends directly on the isoparaffin content of the feed. If the main objective is to produce high-octane gasoline, it is accordingly preferable to use a feed stock having a maximum isoparaffin content.

If the light gasoline treated shows a lower rate of branched isomers than normally required, the process may be performed by imparting a certain isomerizing activity to the catalysts. During treatment, a fraction of the n-paraffins present will then be converted into isoparaffins, thereby producing a larger amount of high octane gasoline. This isomerizing activity can be imparted to the catalyst by the use of a slightly acid support. Such supports include slightly chlorinated gamma alumina (used for reforming), aluminated silica and zeolites. Slightly chlorinated alumina may be obtained simply during introduction of the metal salt, by using a chloride of the metal; in this case the acidity must not be neutralized by adding a basic product or by treatment with steam, as is normally done when preparing hydrogenolysis catalysts. Obviously the support has to possess moderate acidity, to allow isomerization without bringing about cracking of hydrocarbons.

If the feed now has a higher than normal rate of branched isomers, it is important that the support be inert, since isomerization is a reversible reaction. This means that the possible acidity of the support has to be neutralized in order to prevent conversion of isoparaffins into n-paraffins.

These catalysts can be used when the aim is to maximize the yield of high octane gasoline, to the detriment of ethane. If, on the other hand, the aim is to maximize ethane production, moderately acid supports can be used to treat feeds with a high branched hydrocarbon content, while neutral supports are preferably used for feeds with a high linear hydrocarbon content.

It will be easier to understand the characteristics and benefits of this invention from the following description of certain examples, given as illustrations, without being in any way exhaustive.

In these examples, the feed is a desulphurized straight-run gasoline containing less than 1 ppm sulphur, and the research octane number is 61; the feed contains 0.9% by weight butane; 12.4% isopentane; 22.5% n-pentane; 0.2% 2,2-dimethylbutane; 1.5% cyclopentane; 1.4% 2,3-dimethylbutane; 11.3% 2-methylpentane; 7.8% 3-methylpentane, 22.4% n-hexane, 1.8% methylcyclopentane and cyclohexane; 1.5% benzene; 16.3%; heptane. Pentanes therefore contain 35.5% isopentane, and hexanes contain 3.7% dimethylbutanes.

EXAMPLE 1

A catalyst containing 0.5% platinum and 0.1% iridium was prepared by dispersion on alumina, as follows: 100 g of very pure gamma alumina, first treated with an aqueous hydrochloric acid solution, and having a specific surface area of 200 sq.m/g, was placed in contact with 100cc of an aqueous solution containing 0.5g platinum in the form of hexachloroplatinic acid and 0.1g iridium in the form of hexachloroiridic acid. Contact was maintained for about 5 hours. After centrifugation, the catalyst was dried for one hour at 100° C., and activated for 4 hours at 520° C. in the presence of air. The alumina used was a reforming gamma alumina, and after impregnation it contained more than 1% chlorine 50 g of this catalyst was placed in a continuous-flux reactor. After reduction with hydrogen at 450° C., the feed stock to be treated was fed to the reactor in the presence of hydrogen, at a total pressure of 40 bars, with a molar ratio of hydrogen to hydrocarbon of 7, at an hourly spatial velocity of $1h^{-1}$, and at a reaction temperature of 359° C.

Under these operating conditions, the conversion rate was 68.1%, with by weight 5.5% $C_1$, 24.5% $C_2$, 23.6% $C_3$, and 14.4% $C_4$. The remaining 31.9% liquid contained a high proportion of branched products: 77% isopentane in the pentanes cut, and 52.9% dimethylbutanes in the hexanes cut. Heptanes accounted for less than 2% of the liquid, and were all branched. The research octane number of the clear liquid was 84. The effluent contained far more quaternary carbons (dimethylbutanes) than the original feed. Accordingly, the liquid effluent contained a high-branched paraffin content, the linear and low-branched products being preferentially cut into ethane. Alongside hydrogenolysis, the catalyst had an isomerizing effect.

EXAMPLE 2

The experiment described in Example 1 was repeated, except that the reaction temperature was 370° C. This lead to a conversion rate of 90.7%. The effluent contained by 32.510% $C_1$, 37% $C_2$, 29.5% $C_3$, and 13.9% $C_4$. The remaining 9.3% liquid consisted mainly of isopentane, with a research octane number of 92.

In both these examples, the catalysts remained perfectly stable for at least 300 hours.

Example 2 shows that not only are isoparaffins preserved in preference to n-paraffins, but also that it is the heavier paraffins that are hydrogenolysed first.

EXAMPLE 3

This example shows that the catalyst used in this new process is highly selective for the production of propane, particularly ethane, if conversion is pushed to a maximum level. The process is accordingly extremely adaptable, and can be used to produce either ethane and isomerate, or maximum ethane without isomerate.

The example described in example 1 was repeated, except that the reaction temperature was raised to 390° C. The conversion rate was 100%, with no hydrocarbons above $C_4$. Yields of hydrocarbons (% by weight) were:

| $C_1$ | $C_2$ | $C_3$ | $C_4$ |
|---|---|---|---|
| 24.8 | 58.9 | 12.6 | 3.6 |

EXAMPLE 4

This example is given for comparison, to show that the use of bimetallic platinum-iridium catalysts gives better results than those obtained with monometallic catalysts, particularly iridium-supported catalysts, even though iridium offers good selectivity for ethane production by hydrogenolysis of hydrocarbons (cf. Belgian Pat. No. 843,532).

A catalyst containing 0.6% iridium was prepared by dispersion on the same alumina as described in example 1, and using the same method.

This catalyst was tested with the feed described above, and under the same conditions as in example 1, except that the reaction temperature was adjusted so as to obtain a yield of approximately 32% weight of pentane and heavier hydrocarbons. The conversion rate was 67.5%. The obtained yields (% by weight) were:

| $C_1$ | $C_2$ | $C_3$ | $C_4$ |
|---|---|---|---|
| 19.8 | 16.2 | 19.5 | 12.0 |

The remaining 32.5% $C_5+$ liquid contained a much lower proportion of branched products than in example 1, and the research octane number of the clear liquid was 77.

A similar experiment with a platinum-supported monometallic catalyst produced even less satisfactory results. A catalyst containing 0.6% platinum was prepared as in example 1 and tested under the same conditions. The conversion rate was 70%. The $C_5+$ liquid fraction had a research octane number of 75. The gaseous fraction contained (% by weight) 28% $C_1$, 13% $C_2$, 17% $C_3$ and 12% $C_4$.

EXAMPLE 5

This example does not concern the new process, but shows that rhodium catalysts described in the French patent application 75 38 531 are not selective for simultaneous production of ethane and isomerate, although they are selective for ethane hydrogenolysis.

A catalyst containing 0.3% platinum and 0.3% rhodium was prepared by dispersion on alumina, using the method described in French patent application 75 38 531.

50 g of this catalyst was placed in a continuous-flux reactor. After reduction with hydrogen at 450° C., catalysis was carried out under the conditions described in example 1, with the feed described above.

The conversion rate at 305° C. was 60%, and the effluent contained (by weight): 15% $C_1$, 25.3% $C_2$, 12.1% $C_3$ and 8.3% $C_4$. The isopentane content of the pentanes was only 43%.

When the conversion rate was increased to 91% by adjusting the reaction temperature, the content was still only 65%, and there remained 3% hexane in the effluent.

The example shows that rhodium catalysts can do little to increase the isomer content of the liquid effluent.

EXAMPLE 6

This example is given for comparison. The catalyst described in example 1 was used to treat a naphtha feed with a distillation range of 81° to 175° (true boiling points), desulphurized to 1 ppm, at a total pressure of 40 bars, at an hourly spatial velocity of 1 $h^{-1}$, with a molar ratio of hydrogen to hydrocarbon of 9, and at a temperature of 405° C.

This temperature, which is slightly higher than the previous examples, because of the feed to be treated, is quite a lot lower than for conventional reforming processes (approximately 500° C.).

The reaction produced 22.3% $C_5+$ effluent, with a clear research octane number of 65, and a gaseous fraction containing (% by weight): 17.5% $C_1$, 35.2% $C_2$, 18.3% $C_3$ and 9.4% $C_4$.

The octane number of the liquid effluent was low, because it contained almost no aromatics, showing clearly that the new process according to the invention is quite different from reforming, which produces aromatics by dehydrocyclization.

The experiment was repeated at a temperature of 435° C. No products containing more than 4 carbon atoms were obtained, and yields (% by weight) were 40.7% $C_1$, 55% $C_2$, 3.6% $C_3$ and 0.6% $C_4$.

Although the yield of $C_2$ is quite high, results are not satisfactory, because there is a very high proportion of methane.

This example shows that, even where the temperature is below 450° C., providing conditions in which reforming does not occur, the catalytic treatment described in this invention does not apply to naphthas.

It is therefore specific to the treatment of light gasoline.

What is claimed is:

1. A hydrogenolysis process for the simultaneous production of ethane and high octane gasoline by selective hydrogenolysis of light gasoline stocks, wherein a mixture of hydrogen and light gasoline stock containing isoparaffins is contacted in a reactor at a spatial velocity V, at a total pressure P, and at a temperature T, with a catalyst consisting essentially of a porous support of a refractory oxide containing less than 0.5% by weight of $SO_4$ ion, iridium and platinum.

2. A process as defined in claim 1, in which the iridium and platinum content of the catalyst is between 0.1 and 10% by weight.

3. A process as defined in claim 2, in which the iridium and platinum content of the catalyst is between 0.2 and 1%.

4. A process as defined in claim 1, in which the atomic ratio of iridium to platinum is above 0.1.

5. A process as defined in claim 4, in which the atomic ratio of iridium to platinum is between 0.16 and 8.

6. A process as defined in claim 1, in which the hourly spatial velocity V is between 0.1 and $10h^{-1}$.

7. A process as defined in claim 1, in which the porous refractory oxide support of the catalyst is selected from the group comprising alumina, silica, silica-alumina, magnesia, titanium oxide, zinc oxide and zeolites.

8. A process as defined in claim 7, in which the specific surface area of the support is between 10 and 600 sq.m/g.

9. A process as defined in claim 8, in which the specific surface area of the support is between 50 and 500 sq.m/g.

10. A process as defined in claim 1, in which the temperature is between 150° and 470° C.

11. A process as defined in claim 9, in which the porous refractory oxide support is inert.

12. A process as defined in claim 9, in which the porous refractory oxide support is slightly acid, imparting a slight isomerizing activity to the catalyst.

13. A process as defined in claim 12, in which the porous support is selected from the group comprising slightly chlorinated alumina, silica-alumina and zeolites.

14. A process as defined in claim 1, in which the total pressure P is between 1 and 80 bars.

15. A process as defined in claim 14, in which the total pressure P is between 20 and 60 bars.

16. A process as defined in claim 1, in which the molar ratio of hydrogen to hydrocarbon is between 2 and 20.

17. A process as defined in claim 16, in which the molar ratio of hydrogen to hydrocarbon is between 3 and 10.

18. A process as defined in claim 10, in which the temperature is between 250° and 450° C.

* * * * *

UNITED STATES PATENT OFFICE
CERTIFICATE OF CORRECTION

Patent No. 4,157,949     Dated June 12, 1979

Inventor(s) Jean R. Bernard, et al

It is certified that error appears in the above-identified patent and that said Letters Patent are hereby corrected as shown below:

Column 5, line 6: "32.510%" should read --weight 10%--.

Signed and Sealed this

Twentieth Day of November 1979

[SEAL]

Attest:

RUTH C. MASON
Attesting Officer

LUTRELLE F. PARKER
Acting Commissioner of Patents and Trademarks